(12) United States Patent
Bruchmann et al.

(10) Patent No.: US 6,433,124 B1
(45) Date of Patent: Aug. 13, 2002

(54) REACTIVE POLYMERS AND ISOCYANATE-REACTIVE POLYMERS OBTAINABLE THEREFROM

(75) Inventors: Bernd Bruchmann, Freinsheim; Hans Renz, Meckenheim; Heinz-Dieter Lutter, Diepholz, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/561,239

(22) Filed: Apr. 28, 2000

(30) Foreign Application Priority Data

Apr. 29, 1999 (DE) .......................... 199 19 558

(51) Int. Cl.$^7$ .............................. C08G 18/30
(52) U.S. Cl. ................... 528/49; 528/59; 528/73; 548/215; 549/374; 549/453; 252/182.23; 540/467; 544/88
(58) Field of Search ................. 528/49, 59, 73; 540/467; 544/88; 548/215; 549/374, 453; 252/182.23

(56) References Cited

U.S. PATENT DOCUMENTS 4,002,601 A * 1/1977 Hajek et al.

FOREIGN PATENT DOCUMENTS

EP 752 433 * 1/1997

* cited by examiner

*Primary Examiner*—Rachel Gorr
(74) *Attorney, Agent, or Firm*—Fernando A. Borrego; Mary K. Cameron

(57) ABSTRACT

In a compound of the formula I

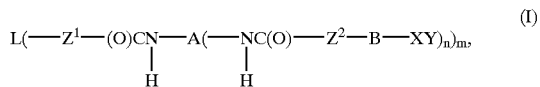

(reactive polymer), L is a, polymer, XY is a reactive radical which is inert toward NCO groups and splits off one or more protective groups Y under acidic, neutral or basic conditions and the radical X bears, after Y has been split off, at least two groups which are reactive toward isocyanates. Also provided are processes for preparing such a polymer and for preparing V a polymer polyol which is obtainable by reacting a polymer of the formula I with an acid or base. A polymer polyol as is obtainable by treatment of a reactive polymer according to the present invention in the neutral, acidic or basic range can be used to produce a polyaddition product or polycondensation product.

15 Claims, No Drawings

REACTIVE POLYMERS AND ISOCYANATE-REACTIVE POLYMERS OBTAINABLE THEREFROM

The present invention relates to a compound of the formula I

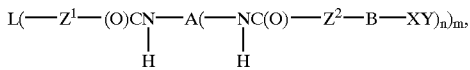

(reactive polymer) where L is a polymer, XY is a reactive radical which is inert toward NCO groups and which splits off one or more protective groups Y under acidic, neutral or basic conditions and the radical X bears, after Y has been split off, at least two groups which are reactive toward isocyanates. Furthermore, the invention relates to a process for preparing such a polymer and also a polymer polyol which is obtainable by reaction of a polymer of the formula I with an acid or base. The invention likewise relates to a polyaddition product or polycondensation product which can be prepared using a polymer polyol as is obtainable by treatment of a reactive polymer according to the present invention in the neutral, acidic or basic range.

High-functionality structures containing OH and/or NH groups are valuable in polyurethane chemistry, especially for producing polyurethane foams and polyurethane-containing coatings. Here, particular importance is often attached to polyurethane prepolymers which, owing to their generally low viscosity, are frequently used as starting materials for the synthesis of high molecular weight and sometimes crosslinked polyurethane polymers. These prepolymers are particularly important in, for example, the production of surface coatings or of moldings.

In general, polyurethane prepolymers are prepared by reacting polyols or polyamines with at least bifunctional isocyanates, with the polyols or polyamines usually having a functionality of at least about 2. If higher-functional polyurethane prepolymers are desired, there are various but generally unsatisfactory possible methods of preparing them. For example, the polyol used can be a low molecular weight relatively high-functionality polyol which is subsequently reacted with appropriate bifunctional isocyanates to give the prepolymer. Disadvantages of this procedure are that the desired polyurethane polymer has only a low molecular weight and that crosslinked, high molecular weight material is formed as by-product.

Another method is, for example, to extend an appropriate low molecular weight polyol at each OH group by means of a polyaddition or polycondensation reaction. Although this does make it possible to obtain high molecular weight polyols, the products have a large number of polymer chains in each polyol molecule corresponding to their functionality and these polymer chains modify, possibly in an undesirable way, the properties of the polyurethane prepolymer or of the product obtained therefrom.

A further possibility is to modify a linear polymer at the end groups in such a way that, for example, the desired number of OH groups or NH groups at the end of the polymer chain is obtained. To prepare a polyester having two OH groups at the end of each chain, it would be possible, for example, to react a polyester molecule having a COOH group at the end of each chain with an excess of trimethylolpropane so as to give a polyester which bears two OH groups at the end of each chain. However, such a reaction is generally uneconomical since excess material has to be separated from the reaction product. In addition, it is usually not possible to prevent at least part of the reaction products from reacting with the polymer added as starting material and thus leading to chain extension or crosslinking.

Various types of high-functionality structures containing OH and/or NH groups are known from the prior art. Thus, for example, pentaerythritol-, sorbitol- or sucrose-initiated polyether polyols based on ethylene oxide or propylene oxide or mixtures thereof are prior art. Such polyether polyols generally have functionalities of from about 3 to about 6.

WO 93/14147 discloses polyamines which have a dendritic structure. Such products are complicated to prepare, since acrylonitrile is grafted onto an amine in a first reaction step and the nitrile is converted into an amine in a subsequent hydrogenation step. This procedure is repeated a number of times until the desired $NH_2$ functionality is achieved. However, a disadvantage of these products is that they have only functionalities, OH functionalities or mixed, i.e. OH- and NH-containing, structures are not obtainable in this way.

WO 93/17060 discloses polyester polyols which are formed, for example, by reaction of TMP or pentaerythritol with dimethylolpropionic acid. However, the reaction proceeds very unselectively and highly branched structures are obtained.

DE-A 195 24 045 relates to highly functionalized polyurethanes which are built up from molecules having the functional groups $A(B)_n$, where A is an NCO group for a group which reacts with an NCO group, B is an NCO group or a group which reacts with an NCO group, A is reactive toward B and n is a natural number and is at least 2. The structures disclosed can be used for preparing dendritic compounds. A simple process for preparing polymers in which the building up of functionality and the building up of molecular weight are largely decoupled is not disclosed in the document.

There is therefore a need for a process which allows a polymer to be provided in a simple manner with end groups so that the number of end groups per chain end is at least two and essentially no chain extension between the individual polymer molecules takes place. Furthermore, there is a need for compounds which are obtainable by such a process.

It is an object of the present invention to provide a polymeric compound which can be converted by means of a simple chemical reaction into a molecule which has at least two functional groups which are reactive toward NCO groups per molecule. A further object of the invention is to provide a process for preparing such a compound. It is also an object of the invention to provide a simple process for multiplying the number of isocyanate-reactive end groups in polymers which are reactive toward NCO and are free of urethane groups.

We have found that these objects are achieved by a compound of the formula I

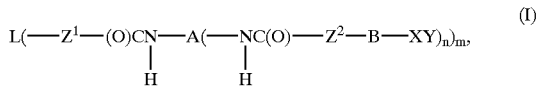

as defined in the text below.

The present invention accordingly provides a compound of the formula I

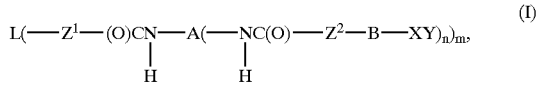

(I)

where L is a polymer which is free of urethane groups and has a molecular weight $M_n$ of at least 300, or any linear or branched sequence of two or more such polymers, A is a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms or an arylene-alkylene group having from 7 to 18 carbon atoms or a heterocyclic group or any linear or branched sequence of two or more of the groups mentioned, $Z^1$ and $Z^2$ are each, independently of one another, NR, S or O, R is H, $CH_3$ or a substituted or unsubstituted, linear or branched, saturated or unsaturated alkyl group having from 2 to 12 carbon atoms of a substituted or unsubstituted, saturated or unsaturated cycloalkyl group or a substituted or unsubstituted aryl group having from 3 to 18 carbon atoms, or any linear or branched sequence of two or more of the groups mentioned, B is a covalent bond, $CH_2$ or a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms, or any linear or branched sequence of two or more of the groups mentioned, n is from 1 to 20, m is from 1 to 50 and XY is a reactive radical which is inert toward NCO groups, where the reactive radical splits off one or more protective groups Y under acidic, neutral or basic conditions and the radical X bears E, after Y has been split off, at least two groups which are reactive toward isocyanates.

For the purposes of the present invention, the term "reactive radical" refers to a radical which can be converted by a simple chemical reaction, for example by treatment with an acid or a base, into a radical which bears at least two groups which are capable of reacting with isocyanates. In a preferred embodiment of the invention, the reactive radical contains at least two protected functional groups which are reactive toward isocyanates after the protective group has been split off.

As shown in formula I, the reactive polymer of the invention has a radical L which is a polymer which is free of urethane groups and has a molecular weight of at least about 300. In a preferred embodiment of the present invention, L is a polyester, a polyamine, a polyamide, a polycarbonate, a polyether, a polyacrylate, a polymethacrylate, a polysilane, a polysilazane, a polysiloxane, an aliphatic or aromatic, saturated or unsaturated hydrocarbon or a polysulfone.

In a first preferred embodiment of the present invention, L. is a polyester radical which had an original functionality toward NCO groups of m. Suitable radicals L are, for example, polyesters which originally had one or more OH groups, one or more $NH_2$ or NHR groups or a mixture of two or more thereof, or one or more SH groups, or a mixture of two or more of the groups mentioned.

The preparation of polyesters which are suitable for the purposes of the present invention is, for example, known from the specialist literature to which specific reference is made in this context. Particularly suitable polyesters are described, for example, in G. W. Becker, D. Braun, Kunststoffhandbuch No. 7, Polyurethane, Carl Hanser-Verlag, Munich 1993; the disclosure in this literature reference is expressly incorporated by reference into the disclosure of the present text.

In a further preferred embodiment of the present invention, L is a polyamide radical which had an original functionality toward NCO groups of m. Examples of suitable radicals are polyamides which originally had one or more OH groups, one or more $NH_2$ or NHR groups or a mixture of two or more thereof, or one or more SH groups, or a mixture of two or more of the groups mentioned.

The preparation of polyamides which are suitable for the purposes of the present invention is, for example, known from the specialist literature to which specific reference is made in this context. Particularly suitable polyamides are described, for example, in G. W. Becker, D. Braun, Kunststoffhandbuch No. 3/4 Polyamide, Carl Hanser-Verlag, Munich 1998; the disclosure in this literature reference is expressly incorporated by reference into the disclosure of the present text.

In a further preferred embodiment of the present invention, L is a polycarbonate radical which had an original functionality toward NCO groups of m. Suitable radicals are, for example, polycarbonates which originally had one or more OH groups, one or more $NH_2$ or NHR groups or a mixture of two or more thereof, or one or more SH groups, or a mixture of two or more of the groups mentioned.

The preparation of polycarbonates which are suitable for the purposes of the present invention is known, for example, from the specialist literature to which specific reference is made in this context. Particularly suitable polycarbonates are described, for example, in G. W. Becker, D. Braun, Kunststoffhandbuch No. 3/1, Polycarbonate, Polyacetale, Polyester, Celluloseester, Carl Hanser-Verlag, Munich 1992; the disclosure in this literature reference is expressly incorporated by reference into the disclosure of the present text.

In a further preferred embodiment of the present invention, L is a polyether radical which had an original functionality toward NCO groups of m. Examples of suitable radicals are polyethers which originally had one or more OH groups, one or more $NH_2$ or NHR groups or a mixture of two or more thereof, or one or more SH groups, or a mixture of two or more of the groups mentioned. Polyesters which are particularly suitable in the present context are, for example, polyethylene oxides, polypropylene oxides, polybutylene oxides, polytetrahydrofuran and their mixtures and copolymers which may have either a random or a block structure.

The preparation of polyethers which are suitable for the purposes of the present invention is known, for example, from the specialist literature to which specific reference is made in this context. Particularly suitable polyethers are described, for example, in G. W. Becker, D. Braun, Kunststoffhandbuch No. 7, Polyurethane, Carl Hanser-Verlag, Munich 1993; the disclosure in this literature reference is expressly incorporated by reference into the disclosure of the present text.

In a further preferred embodiment of the present invention, L is a polyacrylate or polymethacrylate radical which, before application of the process of the present invention, had an original functionality toward NCO groups of m. Examples of suitable radicals are polyacrylates or polymethacrylates which originally had one or more OH groups, one or more $NH_2$ or NHR groups or a mixture of two or more thereof, or one or more SH groups, or a mixture of two or more of the groups mentioned.

The preparation of polyacrylates and polymethacrylates which are suitable for the purposes of the present invention is known, for example, from the specialist literature to which specific reference is made in this context. Particularly suitable polyacrylates and polymethacrylates are described, for example, in Kittel, Lehrbuch der Lacke und Beschichtungen, Volume 2, Bindemittel für 1 ösemittelhaltige und lösemittelfreie Systeme, S. Hirzel-Verlag, Stuttgart 1998; the disclosure in this literature reference is expressly incorporated by reference into the disclosure of the present text.

In a further preferred embodiment, L is a highly branched or hyperbranched structure or dendritic structure as is described, for example, in G. R. Newkome, C. N. Moorefield, F. Vögtle, Dendritic Molecules, Verlag Chemie, Weinheim 1996.

$Z^1$ in formula I is NR, S or O. In a preferred embodiment of the present invention, $Z^1$ is NR or O. The radical R is preferably H or a linear alkyl radical having from 1 to about 6 carbon atoms, for example a methyl, ethyl, propyl, butyl, pentyl or hexyl radical.

In a preferred embodiment of the present invention, m is from 1 to about 50, in particular from about 2 to about 20, or from about 3 to about 15, for example about 4, 5, 6, 8, 10, 11, 12, 13, or 14. Particular preference is given to m being from about 2 to about 10. It is also possible for m to be a number other than a natural number, for example when the polymer used is an industrial mixture of polymers having various functionalities.

The molecular weight $M_n$ of the radical L is, in a preferred embodiment of the invention, at least about 300. Depending on the desired use of the reactive polymer and the nature of the polymeric radical L, the molecular weight can vary widely. It can be up to about 2,000,000, or even more. Examples of molecular weights of the radical L which are suitable for the purposes of the present invention are from about 300 to about 1,000,000, from about 500 to about 500,000, from about 800 to about 200,000 or from about 1000 to about 100,000. Depending on the planned use of the reactive polymer, any molecular weights lying between these are also possible, for example from about 1500 to about 50,000 or from about 2000 to about 20,000 or from about 3000 to about 10,000.

In a further preferred embodiment of the present invention, the equivalent weight per functional group which is reactive toward isocyanates is at least about 50, but even higher in a preferred embodiment, for example at least about 100 or at least about 200.

Higher values are also possible, for example about 500, 800, 1000, 1500, 2500 or 4000.

In a further preferred embodiment of the invention, A is an alkylene group, cycloalkylene group, arylene group, arylene-alkylene group or a heterocyclic group, corresponding to the core groups of the polyisocyanates customarily used in polyurethane chemistry. Examples of such isocyanates are tolylene 2,4-diisocyanate(2,4-TDI), tolylene 2,6-diisocyanate(2,6-TDI), or a mixture of these isomers, diphenylmethane 2,2'-diisocyanate(2,2'-MDI), diphenylmethane 2,4'-diisocyanate(2,2'-MDI), diphenylmethane 4,4'-diisocyanate(4,4'-MDI), naphthylene 1,5-diisocyanate (NDI), phenylene 1,4-diisocyanate, tetramethylxylylene 1,3-diisocyanate (TMXDI), hydrogenated MDI (HMDI) y isophorone diisocyanate (IPDI), hexamethylene 1,6-diisocyanate (HDI), 2-isocyanatopropylcyclohexyl isocyanate (IPCI), 2-butyl-2-ethylpentamethylene diisocyanate (BEPDI), lysine diisocyanate (LDI), dodecyl 1,12-diisocyanate, cyclohexyl 1,3- or 1,4-diisocyanate, 2-pentamethylene diisocyanate (MPDI) or the like. Likewise suitable are dimerization or trimerization products of diisocyanates, for example ones containing urethane, allophanate, urea, biuret, uretdione, carbodiimide or uretonimine groups, as are formed in the dimerization or trimerization of the abovementioned diisocyanates. Further suitable compounds are oligomeric or polymeric compounds containing isocyanate groups, as are obtained, for example, in the preparation of isocyanates or remain as residues in the distillation bottoms from the distillation of crude isocyanate products. Examples of materials which are particularly suitable in this context are crude MDI, as is obtainable directly after the preparation of MDI, and polymeric MDI, as remains in the distillation bottoms after the distillation of MDI from the crude MDI.

In a preferred embodiment of the present invention, A in formula I is accordingly one of the radicals bearing the NCO groups in the above mentioned polyisocyanates.

$Z^2$ in the formula I is NR, S or O. In a preferred embodiment of the present invention, $Z^2$ is NR or O. The radical R is preferably H or a linear alkyl, radical having from 1 to about 6 carbon atoms, for example a methyl, ethyl, propyl, butyl, pentyl or hexyl radical.

B in the formula I is, in a preferred embodiment of the present invention, a linear alkylene radical having from 1 to 4 carbon atoms, for example a methylene, ethylene, propylene or butylene radical.

In a preferred embodiment. of the present invention, n in the formula I is from 1 to about 5.

In a preferred embodiment of the present invention, m in the formula I is from 2 to about 30.

XY in the formula I is a reactive radical which is inert toward NCO groups. The reactive radical XY splits off one or more protective groups Y under acidic, neutral or basic conditions so that the radical X after Y has been split off bears at least two groups which are reactive toward isocyanates. In a preferred embodiment, XY is 2,2-dimethyl-1,3-dioxolane or 2,2-dimethyl-5-ethyl-1,3-dioxane or 2isopropyl-1,3-oxazolidine, where the covalent bond to the radical B is in the 4 position, 5 position or 1 position, in each of the reactive radicals mentioned as preferred.

In a preferred embodiment of the invention, the reactive polymer of the invention has a dioxane, dioxolane or oxazolidine group as reactive radical XY.

In a further preferred embodiment of the present invention, $Z^2$ is O.

In a further preferred embodiment of the invention, B is $CH_2$ or a linear alkylene radical having from 2 to about 6 carbon atoms.

In a further preferred embodiment of the invention, XY is a radical of the following formulae II to IV.

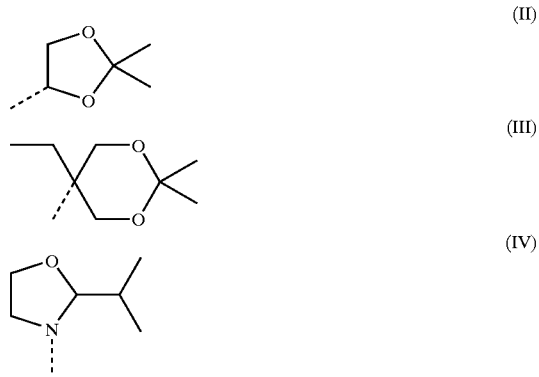

where the broken lines indicate the position of the covalent bond to B.

The reactive polymers of the present invention can be obtained by a single-stage or multistage reaction. If the reaction is carried out in more than one step, the first step generally comprises reacting an isocyanate containing at least two NCO groups and having the formula V

A(—NCO)$_n$ (V)

with at least one compound of the formula VI

HZ$^2$—B—XY (VI), where A, Z$^2$, B, X, Y and n are as defined above.

In this reaction, the ratio of isocyanate-reactive groups HZ$^2$ to isocyanate groups is usually from about 0.05:1 to about 0.6:1.

Suitable isocyanates of the formula V are all the isocyanates having at least two NCO groups which have been mentioned above.

Suitable compounds of the formula VI are, in particular, compounds in which Z$^2$ is NR or O, in particular O. Examples of compounds of the formula VI which can be used are 2,2-dimethyl-4-hydroxymethyl-1,3-dioxolane (see formula VII), whose preparation is described in DE 19 647 395, and 2,2-dimethyl-5-ethyl-5-hydroxymethyl-1,3-dioxane (formula VIII), whose preparation is described in DE 19 647 395, and 1-(hydroxyethyl)-2-isopropyl-1,3-oxazolidine (formula IX), whose preparation is described in DE 2 245 636.

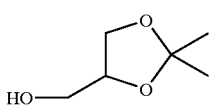

(VII)

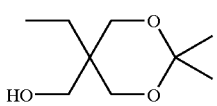

(VIII)

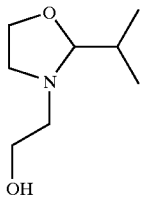

(IX)

The reaction is carried out under the customary conditions as are usual in the reaction of NCO groups with groups which are reactive toward NCO groups and are known to those skilled in the art. In a preferred, embodiment, n in the formula V is from 2 to about 20, in particular from 2 to about 6.

The reaction generally takes place at 60° C., and the appropriate isocyanate is generally initially charged and the compound of the formula VI, or a mixture of two or more such compounds, is added. If the isocyanate of the, formula V is an aliphatic isocyanate, it is possible, for example, to add a catalyst or a mixture of two or more catalysts to aid the reaction with the compound of the formula VI. Suitable catalysts are known to those skilled in the art. In a preferred embodiment of the invention, dibutyltin dilaurate is used as catalyst. The amount of catalyst is generally from about 10 to about 10,000 ppm, for example from about 200 to about 1000ppm, based on the isocyanate.

The reaction generally proceeds exothermically and can be carried out isothermally by means of appropriate cooling during the reaction. However, it is also possible for the temperature of the reaction mixture to rise, for example to about 80° C., during the course of the reaction.

After all the reactants have been added, the reaction can either be stopped immediately or it can be left to react further, for example for an additional time of from about 10 minutes to about five hours. The mixture is preferably stirred during this time. The resulting reaction mixture can subsequently be worked up, but generally only after cooling the reaction mixture. The reaction product of the first step can be isolated at this point using customary methods, for example by crystallization, distillation or similar methods.

The reaction product formed in the first step is subsequently, in a second step, reacted with a polymer of the formula X

L(Z$^1$H)$_m$ (X)

where L and Z$^1$ are as defined above. The reaction generally takes place at from about 0° to about 80° C., preferably at about 25, 50, 60 or 70° C., with the reaction product from the first step generally being initially charged and the polymer of the formula X, or a mixture of two or more such compounds, being added over a variable period of time. If the reaction product from the first step is solid or has a viscosity which is too high, the reaction can, for example, be carried out in a solvent. Suitable solvents are inert toward the functional groups participating in the reaction and are known to those skilled in the art, If desired, a catalyst or a mixture of two or more catalysts can be added to aid the reaction with the polymer of the formula X. Suitable catalysts are known to those skilled in the art. In a preferred embodiment of the invention, dibutyltin dilaurate is used as catalyst. The amount of catalyst is generally from about 10 to about 10,000 ppm, for example from about 200 to about 1000 ppm, based on the isocyanate.

The reaction generally proceeds exothermically, and can be carried out isothermally by means of appropriate cooling during the reaction. However, it is also possible for the temperature of the reaction mixture to rise, for example to from about 80 to about 100° C., during the course of the reaction.

After all the reactants have been added, the reaction can either be stopped immediately or it can be left to react further, for example for an additional time of from about 10 minutes to about five hours. The mixture is preferably stirred during this time.

The overall reaction can, as described, be carried out in a plurality of steps. However, it is also possible to carry out the reaction in a single step, i.e. in a single reaction vessel, with, for example, the isocyanate being initially charged and the further reactants being added subsequently, either simultaneously or in succession.

The resulting mixture comprising the reaction product can subsequently be worked up to isolate the novel reactive polymer of the formula I. The work up is advantageously carried out under conditions which do not lead to an opening of the reactive group XY. Suitable work-up methods, for example with exclusion of moisture or under acidic, basic or neutral conditions, are known to those skilled in the art.

However, it is likewise possible to carry out an opening of the reactive group immediately after the preparation of the reactive polymer of the present invention. For this purpose, the mixture comprising the reaction product is subjected to conditions which lead to opening of the reactive group so as to split off the protective group.

The present invention therefore also provides a process for preparing a reactive polymer, which comprises reacting an isocyanate containing at least two NCO groups and having the formula V

A(—NCO)$_n$ (V)

with at least one compound of the formula VI

HZ²—B—XY (VI), where A, Z², B, X, Y and n are as defined above, and a polymer of the formula X L(Z¹H)$_m$ (X), where L and Z¹ are as defined above, in one or more successive steps, where the molar ratio of HZ² groups to NCO groups is from about 0.4:1 to 0.6:1, the molar ratio of HZ¹ groups to NCO groups is from about 0.1:1 to 10:1 and the total ratio of HZ¹ and HZ² groups to NCO groups is from about 0.55:1 to 10:1.

The reactive polymers of the present invention can, as indicated above, be converted, for example by means of a simple reaction with an acid or a base, preferably with an acid, into polymers which have at least four functional groups which are reactive toward NCO groups. In a preferred embodiment of the invention, the number of functional groups which are reactive toward NCO groups is exactly doubled in the polymer compounds of the present invention.

The present invention therefore also provides a polymer compound which contains at least four urethane or urea groups and can be prepared by reacting a reactive. polymer of the formula I

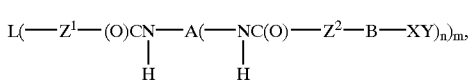

(I)

with an acid or a base, where L, Z¹, Z², A, B, X, Y, n and m are as defined above.

The process of the present invention is suitable for exactly doubling the number of groups which are reactive toward isocyanates in polymers X of the abovementioned type which are free of urethane groups, and have at least one functional group which is reactive toward isocyanates.

The present invention therefore also provides a process for doubling the number of groups which are reactive toward isocyanates in polymers which are free of urethane groups, which comprises reacting a polymer which is free of urethane or urea groups and has the formula X L(Z¹)$_m$ (X), with a compound of the formula XI

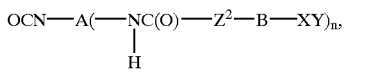

(XI)

The compound of the formula XI is obtainable by the methods described in the present text for carrying out the first step.

The present invention likewise provides for the use of a compound of the formula XI for doubling the number of functional groups which are reactive toward isocyanates in polymers which are free of urethane groups and have at least one functional group which is reactive toward isocyanates.

The novel polymer compounds having at least four urethane or urea groups are suitable for preparing polyaddition products or polycondensation products. Useful polyaddition products are, for example, polyurethane or polyethers. Useful polycondensation products are, for example, polyesters or polyamides. The present invention therefore, also provides a polyaddition product or polycondensation product which can be prepared using a polymer compound according to the present invention which, contains at least two urethane groups and double the number, relative, to urethane groups, of functional groups which are reactive toward NCO groups.

The invention is illustrated by the following examples.

EXAMPLES

1. Cyclic Ketals or Oxazolidines Used for the Synthesis

A list of the heterocyclic compounds used is given in the following table:

TABLE 1

OH components as reactants

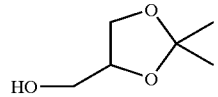 (VII)

 (VIII)

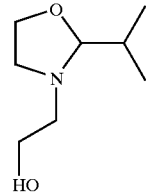 (IX)

| No. | Name |
|---|---|
| VII | 2,2-Dimethyl-4-hydroxymethyl-1,3-dioxolane (isopropylideneglycerol) |
| VIII | 2,2-Dimethyl-5-ethyl-5-hydroxymethyl-1,3-dioxane (isopropylidene-TMP) |
| IX | 1-(Hydroxyethyl)-2-isopropyl-1,3-oxazolidine |

2. Monourethanes from HDI 1680 g of HDI (10 mol) and 0.84 g of dibutyltin dilaurate, (500 ppm based on HDI) were placed in a reaction vessel under a blanket of nitrogen and heated to 50° C. At this temperature, 2 mol of the OH component indicated in Table 1 were added dropwise over a period of 30 minutes. The mixture was allowed to react further at 50° C. for 30 minutes. The product was subsequently freed of monomeric HDI by distillation in a thin film evaporator at 135° C. and 2.5 mbar. The residual monomer content of the end product was less than 0.5% of HDI. The product data are shown in Table 2.

3. Monourethanes from the Aromatic Diisocyanates TDI and MDI

The aromatic diisocyanate was placed in a reaction vessel under a blanket of nitrogen and heated to 80° C., after which the OH component indicated in Table 1 was added dropwise at this temperature over a period of 30 minutes. The mixture was subsequently allowed to react further at 80° C. for 60 minutes. The molar ratio of isocyanate to OH component was 1:1 in addition to the monomeric isocyanate, the diurethane was obtained as by-product. The data are shown in Table 2.

Table 2: Starting materials and data for the monourethanes

TABLE 2

Starting materials and data for the monourethanes

| Product No. | Isocyanate | Alcohol (see Tab. 1) | Product viscosity (mPas) | Preparation | NCO content (%) |
|---|---|---|---|---|---|
| 1 | HDI | VII | 174 (25° C.) | M 1 | 14.0 |
| 2 | HDI | VIII | 1690 (25° C.) | M 1 | 12.3 |
| 3 | HDI | IX | 460 (25° C.) | M 1 | 12.8 |
| 4 | 2,4-TDI | VII | 1200 (50° C.) | M 2 | 12.7 |
| 5 | 4,4'-MDI | VIII | Melting point 93° C. | M 2 | 9.9 |

HDI = Hexamethylene 1,6-diisocyanate
2,4-TDI = Tolylene 2,4-diisocyanate
4,4'-MDI = Diphenylmethane 4,4'-diisocyanate
M = Method

4. Preparation of the Reactive Polyurethanes

The monourethane derived from the diisocyanate and the protected triol or protected aminoalcohol, if desired dissolved in dry THF, was placed in a reaction vessel and heated to 60° C., after which a polymer polyol as indicated in Table 3 was added at this temperature over a period of 30 minutes. The amount added was calculated so that one mole of OH groups was used per mole of NCO groups. In the case of aliphatic monourethanes, 500 ppm (based on the polymer polyol) of dibutyltin dilaurate were additionally used as catalyst. After addition of the polyol, the product mixture was stirred at 60° C. for another 3 hours. After cooling, a mixture of 85% by volume of methanol and 15% by volume of distilled water, which mixture had previously been adjusted to a pH of 2 by means of concentrated hydrochloric acid, was added. In the hydrolysis of the oxazolidine (product 10 in Table 3), the addition of hydrochloric acid was omitted. The product mixture was refluxed for 8 hours, and the products which had been treated with HCl were then neutralized with ammonium carbonate and filtered. The solvent mixture was subsequently removed, firstly at atmospheric pressure and then at 3 mbar. The corresponding product data are shown in Table 3.

TABLE 3

| Product No. | Polyol | Isocyanate (Tab. 2) | Product viscosity (23° C.) | Mean functionality |
|---|---|---|---|---|
| 6 | A | 1 | 550 (80% in methanol) | 4 OH |
| 7 | A | 2 | 20100 | 4 OH |
| 8 | B | 1 | 5220 (70% in methanol) | 6 OH |

TABLE 3-continued

| Product No. | Polyol | Isocyanate (Tab. 2) | Product viscosity (23° C.) | Mean functionality |
|---|---|---|---|---|
| 9 | B | 2 | 22300 | 6 OH |
| 10 | C | 3 | $T_g < 0°$ C. | 2 OH, 2 NH |

Polyols:
A: Polyoxypropylenediol, OH number = 56 mg KOH/g, mean molecular weight = 2004 g/mol
B: Polyoxypropylene-polyoxyethylenetriol (proportion of EO = 75%), OH number = 24 mg KOH/g, mean molecular weight = 7013 g/mol
C: Polytetrahydrofuran, OH number = 173 mg KOH/g, mean molecular weight = 649 g/mol

We claim:

1. A process for doubling the number of groups which are reactive toward isocyanates in polymers which are free of urethane groups, which comprises reacting a polymer which is free of urethane groups and has the formula X:

$$L(Z^1H)_m \qquad (X),$$

with a compound of the formula XI:

$$OCN-A(-NC(O)-Z^2-B-XY)_n, \qquad (XI)$$
$$\quad\quad\quad\quad\;\; |$$
$$\quad\quad\quad\quad\; H$$

where L is a polymer which is free of urethane groups and has a molecular weight Mn of at least 300, or any linear or branched sequence of two or more such polymers, A is a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms or an arylene-alkylene group having from 7 to 18 carbon atoms or a heterocyclic group or any linear or branched sequence of two or more of the groups mentioned, $Z^1$ and $Z^2$ are each, independently of one another, NR, S or O, R is H, $CH_3$ or a substituted or unsubstituted, linear or branched, saturated or unsaturated alkyl group having from 2 to 12 carbon atoms or a substituted or unsubstituted, saturated or unsaturated cycloalkyl group or a substituted or unsubstituted aryl group having from 3 to 18 carbon atoms, or any linear or branched sequence of two or more of the groups mentioned, B is a covalent bond, $CH_2$ or a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms, or any linear or branched sequence of two or more of the groups mentioned, n is from 1 to 20, m is from 1 to 50 and XY is a reactive radical which is inert toward NCO groups, where the reactive radical splits off one or more protective groups Y under acidic, neutral or basic conditions and the radical X bears, after Y has been split off, at least two groups which are reactive toward isocyanate and XY is a dioxane, dioxolane or oxazolidine group.

2. A process for doubling the number of functional groups which are reactive toward isocyanates in polymers which are free of urethane groups and have at least one functional group which is reactive toward isocyanates, using a compound of the formula XI:

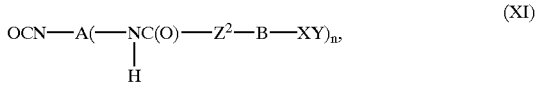

where A is a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms or an arylene-alkylene group having from 7 to 18 carbon atoms or a heterocyclic group or any linear or branched sequence of two or more of the groups mentioned, $Z^2$ is NR, S or O, R is H, $CH_3$ or a substituted or unsubstituted, linear or branched, saturated or unsaturated alkyl group having from 2 to 12 carbon atoms or a substituted or unsubstituted, saturated or unsaturated cycloalkyl group or a substituted or unsubstituted aryl group having from 3 to 18 carbon atoms, or any linear or branched sequence of two or more of the groups mentioned, B is a covalent bond, $CH_2$ or a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms, or any linear or branched sequence of two or more of the groups mentioned, n is from 1 to 20, and XY is a reactive radical which is inert toward NCO groups, where the reactive radical splits off one or more protective groups Y under acidic, neutral or basic conditions and the radical X bears, after Y has been split off, at least two groups which are reactive toward isocyanate and XY is a dioxane, dioxolane or oxazolidine group.

3. A compound of the formula I

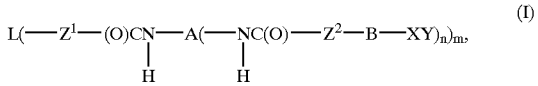

where L is a polymer which is free of urethane groups and has a molecular weight Mn of at least 300, or any linear or branched sequence of two or more such polymers, A is a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms or an arylene-alkylene group having from 7 to 18 carbon atoms or a heterocyclic group or any linear or branched sequence of two or more of the groups mentioned, $Z^1$ and $Z^2$ are each, independently of one another, NR, S or O, R is H, $CH_3$ or a substituted or unsubstituted, linear or branched, saturated or unsaturated alkyl group having from 2 to 12 carbon atoms or a substituted or unsubstituted, saturated or unsaturated cycloalkyl group or a substituted or unsubstituted aryl group having from 3 to 18 carbon atoms, or any linear or branched sequence of two or more of the groups mentioned, B is a covalent bond, $CH_2$ or a substituted or unsubstituted, linear or branched, saturated or unsaturated alkylene group having from 2 to 12 carbon atoms or a substituted or unsubstituted, saturated or unsaturated cycloalkylene group or a substituted or unsubstituted arylene group having from 3 to 18 carbon atoms, or any linear or branched sequence of two or more of the groups mentioned, n is from 1 to 20, m is from 1 to 50 and XY is a reactive radical which is inert toward NCO groups, where the reactive radical splits off one or more protective groups Y under acidic, neutral or basic conditions and the radical X bears, after Y has been split off, at least two groups which are reactive toward isocyanate and wherein the reactive radical XY is a dioxane or dioxolane group.

4. A compound as claimed in claim 3, wherein $Z^1$ is O.

5. A compound as claimed in claim 3, wherein $Z^2$ is O.

6. A compound as claimed in claim 3, wherein $Z^1$ and $Z^2$ are O.

7. A compound as claimed in claim 3, wherein B is $CH_2$.

8. A compound as claimed in claim 3, wherein B is a linear alkylene radical having from 2 to 6 carbon atoms.

9. A compound as claimed in claim 3, wherein XY is a radical having one of the formulae selected from the group consisting of formulae II and III:

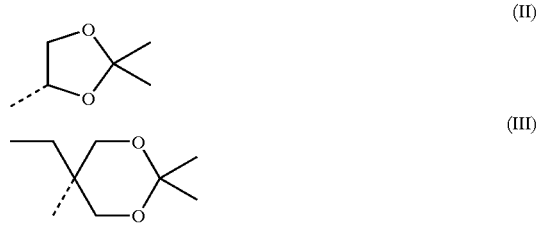

in which the broken lines indicate the position of the covalent bond to B.

10. A compound as claimed in claim 3 which can be prepared by reacting an isocyanate containing at least two NCO groups and having the formula V

with at least one compound of the formula VI

where A, $Z^2$, B, X, Y and n are as defined in claim 3, wherein the ratio of $HZ^2$ groups to NCO groups is selected so as to give a reaction product having at least one free NCO group, and subsequently reacting the reaction product with a compound of the formula XI

where L, $Z^1$ and m are as defined in claim 3.

11. A compound as claimed in claim 10, wherein the compound of the formula VI which is used is a compound selected from the group consisting of the formula VII and VIII:

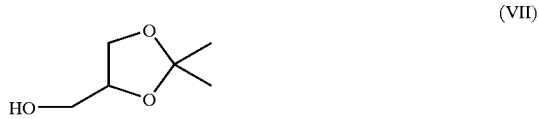

-continued

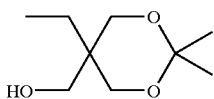
(VIII)

12. A process for preparing a compound as claimed in claim 3, which comprises reacting an isocyanate containing at least two NCO groups and having the formula V:

A(—NCO)$_n$ (V)

with at least one compound of the formula VI:

HZ$^2$—B—XY (VI), where A, Z$^2$, B, X, Y and n are as defined in claim 3, wherein the ratio of HZ$^2$ groups to NCO groups is selected so as to give a reaction product having at least one free NCO group, and subsequently reacting the reaction product with a compound of the formula XI:

L—(Z$^1$H)$_m$ (XI), where L, Z$^1$ and m are as defined in claim 3.

13. A polymer compound containing at least two urethane or urea groups and having double the number, relative to urethane or urea groups, of functional groups which are reactive toward NCO groups, able to be prepared by hydrolysis of a compound of the formula I:

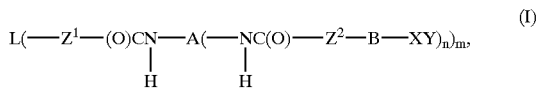
(I)

under acidic, neutral or basic conditions wherein the compound of formula I is as claimed in any of claims 3–12.

14. A polyaddition product which can be prepared using a polymer compound as claimed in claim 13.

15. A polycondensation product which can be prepared using a polymer compound as claimed in claim 13.

* * * * *